(12) United States Patent
Hsu et al.

(10) Patent No.: US 8,410,399 B2
(45) Date of Patent: Apr. 2, 2013

(54) CAPACITOR CHARGE AND DISCHARGE CIRCUIT FOR FASTENER WELDING

(75) Inventors: Christopher Hsu, Avon, OH (US); Larry Church, Jefferson, OH (US); Jeffrey J. Krupp, Vermilion, OH (US)

(73) Assignee: Nelson Stud Welding, Inc., Elyria, OH (US)

( * ) Notice: Subject to any disclaimer, the term of this patent is extended or adjusted under 35 U.S.C. 154(b) by 586 days.

(21) Appl. No.: 12/641,124

(22) Filed: Dec. 17, 2009

(65) Prior Publication Data

US 2010/0170880 A1 Jul. 8, 2010

Related U.S. Application Data

(60) Provisional application No. 61/138,296, filed on Dec. 17, 2008.

(51) Int. Cl.
*B23K 9/12* (2006.01)

(52) U.S. Cl. .................. 219/130.1; 219/130.33; 219/136

(58) Field of Classification Search ............... 219/130.1, 219/130.33, 113, 136
See application file for complete search history.

(56) References Cited

U.S. PATENT DOCUMENTS

| 3,805,143 | A |   | 4/1974 | Tauern et al. | |
| 4,965,860 | A | * | 10/1990 | Jochi | 219/113 |
| 7,307,236 | B2 |   | 12/2007 | Larson et al. | |
| 7,339,807 | B2 | * | 3/2008 | Katooka et al. | 363/71 |

FOREIGN PATENT DOCUMENTS

| JP | 08-01567162 B2 | 1/1996 |
| JP | 08-033977 A | 2/1996 |
| JP | 2000-079464 A | 3/2000 |
| JP | 2001-179461 A | 7/2001 |

* cited by examiner

*Primary Examiner* — Huan Hoang
(74) *Attorney, Agent, or Firm* — Gifford, Krass, Sprinkle, Anderson & Citkowski, P.C.

(57) ABSTRACT

A capacitor discharge (CD) fastener welding circuit including: an input voltage source; a rectifier bridge of diodes receiving the input voltage source; at least two capacitor charge switches linked with the rectifier bridge; at least one capacitor linked with the at least two capacitor charge switches; and at least two capacitor discharge switches linked with the capacitor and to welding output terminals.

24 Claims, 9 Drawing Sheets

CAPACITOR CHARGE AND DISCHARGE CIRCUIT FOR FASTENER WELDING

CROSS-REFERENCE TO RELATED APPLICATIONS

This application claims priority of U.S. Provisional Patent Application Ser. No. 61/138,296 filed on Dec. 17, 2008 the entire content of which is herein incorporated by reference.

FIELD OF THE INVENTION

The invention relates to capacitor discharge welding circuits.

BACKGROUND OF THE INVENTION

In a capacitor discharge type fastener welding device an arc is produced by the rapid discharge of stored electrical energy in a capacitor to a fastener to be welded. The stored electrical energy vaporizes a small projection at the end of a fastener and creates an arc gap. Pressure may be applied to the fastener and the workpiece to be welded following the electrical discharge plunging the fastener into the workpiece to form a weld.

Known prior art capacitor discharge welders may include a transformer and other resistors within a circuit to control the charging of a capacitor in a capacitor discharge welding system. Such prior art designs include a large number of components including large or heavy components such as a transformer leading to an overall increase in the cost and weight and heat, and loss of power conversion efficiency of such designs. The transformer serves several functions in a CD welder: one function is safety isolation between the input and output at a threshold required by international standard; and another function is to transform voltage level. If the input is 115 VAC, it is desirable to use a transformer turns ratio to step up (or boost) voltage for charging the capacitor. If the input is 230 VAC, it is desirable use a transformer turns ratio to step down (or buck) voltage for charging the capacitor. In addition, the prior art with transformer also requires the transformer to be "re-tapped" to accommodate different input voltages to obtain the desired turns ratio. It is the goal of this patent to eliminate the transformer while preserving these functions and accepting both input voltages automatically without re-configuring or re-wiring the circuit.

Another prior art capacitor discharge welder design includes silicon controlled rectifiers (SCRs) that are used to connect and disconnect the capacitor from an input voltage source directly without a transformer. Isolation to the input voltage source normally provided by a transformer is performed by the SCRs as part of the rectifier. However, such prior art design includes limitations in that silicon controlled rectifiers may not be turned off immediately when they are in a conducting state. For example, a silicon controlled rectifier generally cannot be turned off until the current flow through the silicon controlled rectifier falls below a specific minimum threshold level such that the current input is crossing zero. In such designs, the SCRs do not provide disconnection from an input voltage source immediately. For example, a delay can be as long as 8.3 milliseconds when using a 60 Hertz line frequency input power.

Additionally, welding power supply designs must meet international standards such as TEC 60974-1 which requires protection against electric shock and must withstand overvoltage conditions. The peak voltage required is 2950V at 115 VAC input and 5067V at 230 VAC input. A typical SCR has a non-repetitive/repetitive reverse/forward blocking voltage of 200V-2400V. In order to comply with IEC 60974-1, prior art using SCR to isolate input power must use specialty SCR with high blocking voltage rating at high cost and low availability.

Additionally, prior art with SCR controlled capacitor charging circuit without transformer cannot achieve a capacitor DC voltage higher than the rectified input AC power. In welding applications, it is desirable to regulate to a higher voltage and the ability to weld at the same capacitor voltage when input voltage is below the nominal by 10%. At 115 VAC input, prior art without transformer is not capable of welding at voltage higher than 163V. Aluminum fasteners are soft and have high conductivity, which requires about 190V. Copper, brass, copper-zinc alloys and galvanized steel all require higher voltage up to 200V.

There is therefore a need in the art for an improved capacitor discharge welding circuit that includes a low cost and reliable system that allows for immediate disconnect between a capacitor and an input voltage source. Further, there is a need in the art for a capacitor discharge welding circuit that is capable of handling high break over voltages. Additionally, there is a need in the art for a capacitor discharge welding circuit that has the ability to regulate and adjust the voltage based on various application needs.

SUMMARY OF THE INVENTION

In one aspect there is disclosed a capacitor discharge (CD) fastener welding circuit including: an input voltage source; a rectifier bridge of diodes receiving the input voltage source; at least two capacitor charge switches linked with the rectifier bridge; at least one capacitor linked with the at least two capacitor charge switches; and at least two capacitor discharge switches linked with the capacitor and to welding output terminals.

In another aspect there is disclosed a process for capacitor discharge fastener welding including the steps of: a) providing an input voltage source, a rectifier bridge receiving the input voltage source, at least two capacitor charge switches linked with the rectifier bridge, at least one capacitor linked with the at least two capacitor charge switches, at least two capacitor discharge switches linked with the capacitor and to welding output terminals; b) charging the at least one capacitor including closing the at least two capacitor charge switches when the at least two capacitor discharge switches are open; c) opening the at least two capacitor charge switches disconnecting the capacitor from the input voltage source; d) closing the at least two capacitor discharge switches allowing current from the capacitor to discharge through the output terminals; and e) opening the at least two capacitor discharge switches cutting off a current path to the output terminals.

DETAILED DESCRIPTION OF THE PREFERRED EMBODIMENTS

Figure 1A:
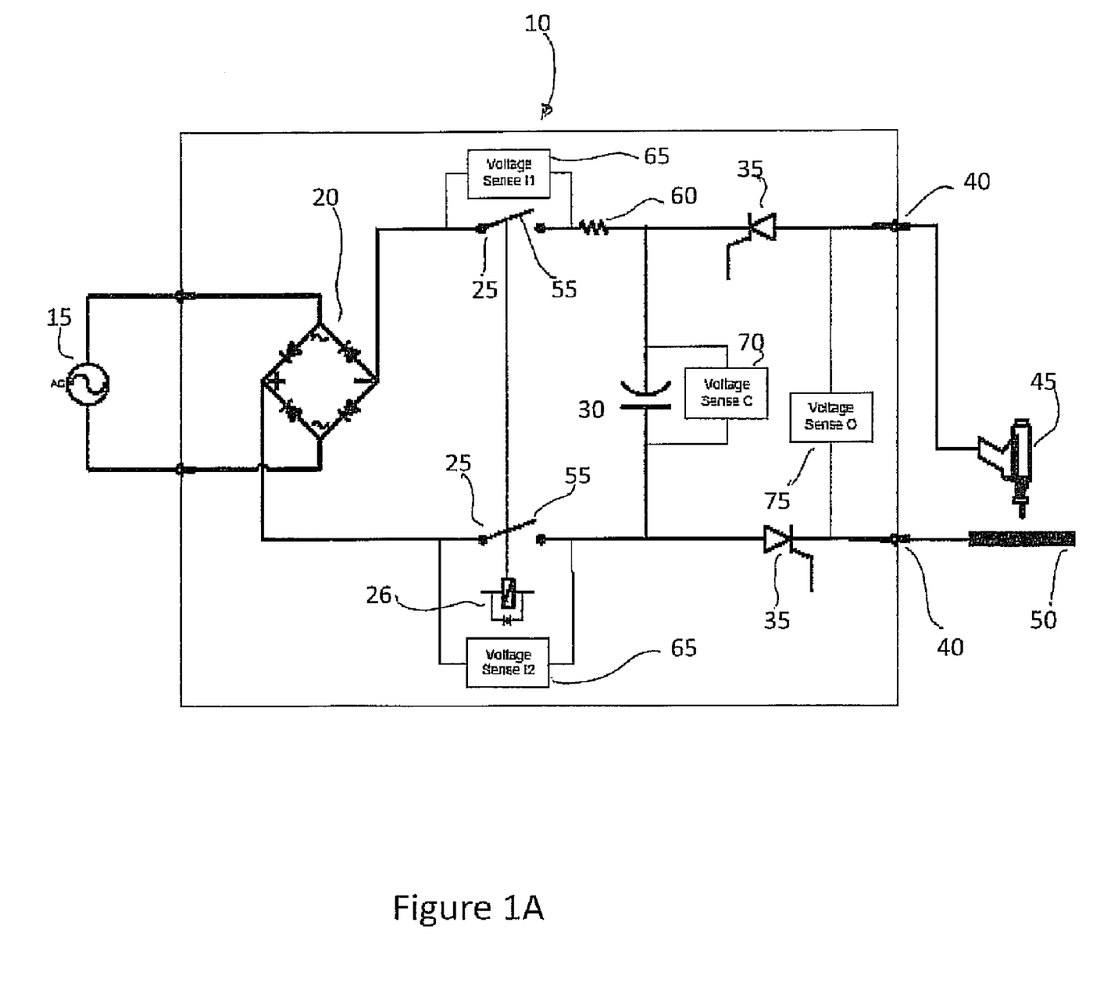
FIGS. 1A and 1B are schematic diagrams of a weld circuit of embodiments for a capacitor discharge welding circuit.
Figure 1B:
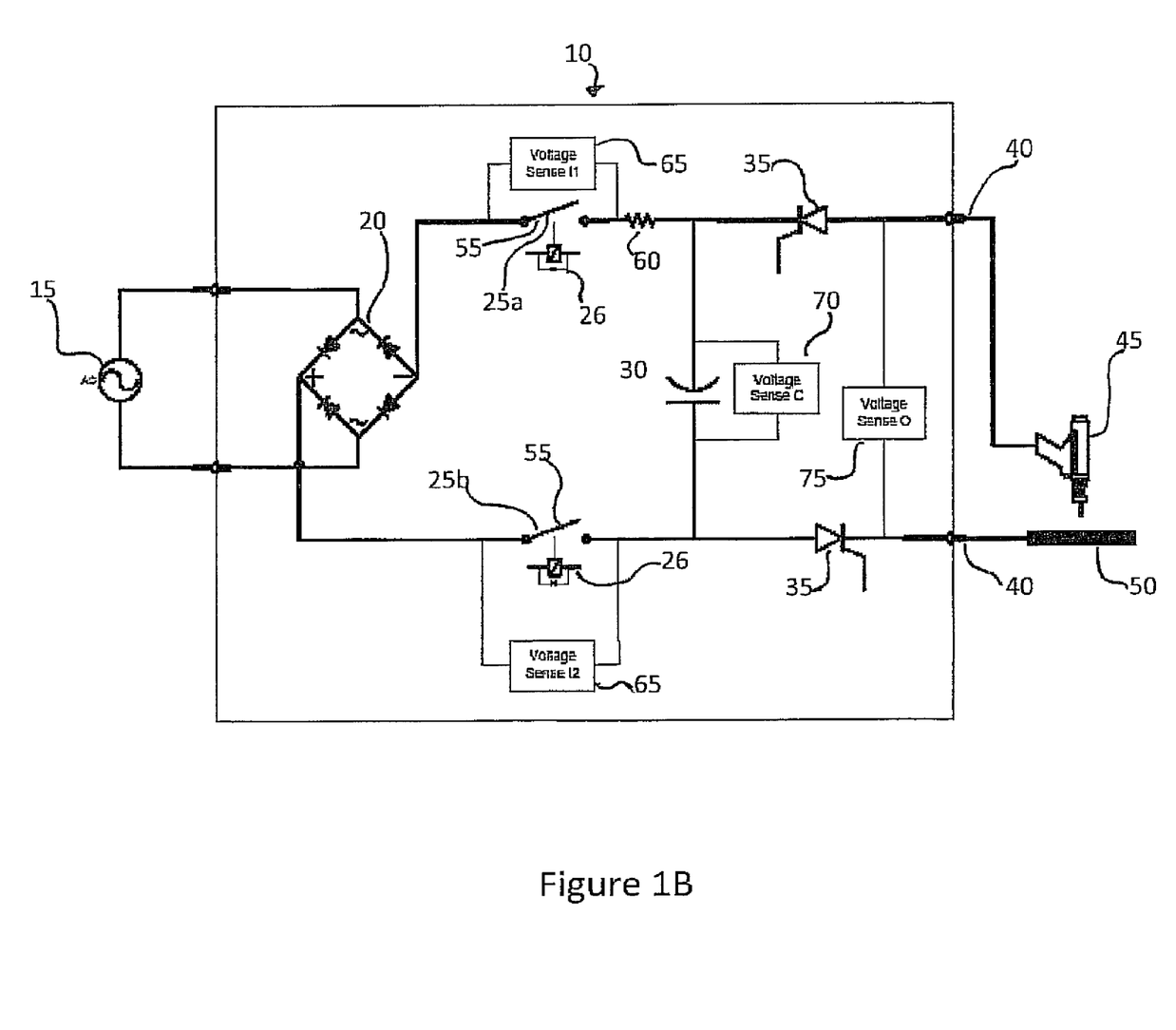

Referring to FIGS. 1A and B, there is shown embodiments of a capacitor discharge welding circuit 10 that includes a input voltage source 15, a rectifier bridge 20 connected to the input voltage source 15, and at least two capacitor charge switches 25 linked to a direct current side of the rectifier bridge 20. In FIG. 1A one coil 26 controls both charge switches. In FIG. 1B independent coils 26 control the charge switches 25a and 25b. Additionally, at least one capacitor 30 is connected to the at least two capacitor charge switches 25. Further, at least two capacitor discharge switches 35 are connected to the capacitor 30 and to welding output terminals 40. As shown in FIG. 1, the welding output terminals 40 may be connected to a weld tool 45 and to a workpiece to be welded 50.

In the depicted embodiments of FIG. 1A, B, the at least two capacitor charge switches 25 may be relay contacts 55. Various relays 55 may be utilized. For example, relays 55 such as Siemens RTD34024 may be utilized. It can withstand 10,000V surge voltage and 10 million operations. As shown in the drawings, the relays 55 may be positioned on the circuit line both to the weld tool 45 and to the workpiece to be welded 50. As shown in FIGS. 1A, B, a resistor 60 may be positioned in series with the capacitor 30. Various resistors 60 may be utilized to adjust a current supplied to the capacitor 30.

The input voltage source 15 depicted includes an AC input voltage source such as an input voltage of 115 volts AC in North America or an input voltage of 230 volts AC that may be utilized in Europe and Asia and North America. Additionally, in the depicted embodiment, the rectifier bridge 20 connected to the input voltage source 15 includes a standard four diode rectifier bridge that is readily available as a prepackaged rectifier bridge. While a four diode rectifier bridge is shown, various rectifier bridges including six diode rectifier bridges (for 3 phases) and other designs may also be utilized. Further, while the depicted input voltage source 15 is illustrated as a single phase input voltage source, various other input powers such as a three phase input power may also be utilized.

As stated above, the at least two capacitor charge switches 25 or relays 55 in the depicted embodiment are connected to at least one capacitor 30. While a single capacitor 30 is shown, it should be realized that various numbers of capacitors 30 such as a plurality of capacitors or a bank of capacitors may be utilized.

The at least one capacitor 30 is connected to the at least two capacitor discharge switches 35. In the depicted embodiment, the at least two capacitor discharge switches 35 may include thyristors that may be opened and closed to isolate the capacitor 30 from the weld tool 45 and the workpiece to be welded 50.

Figure 5:
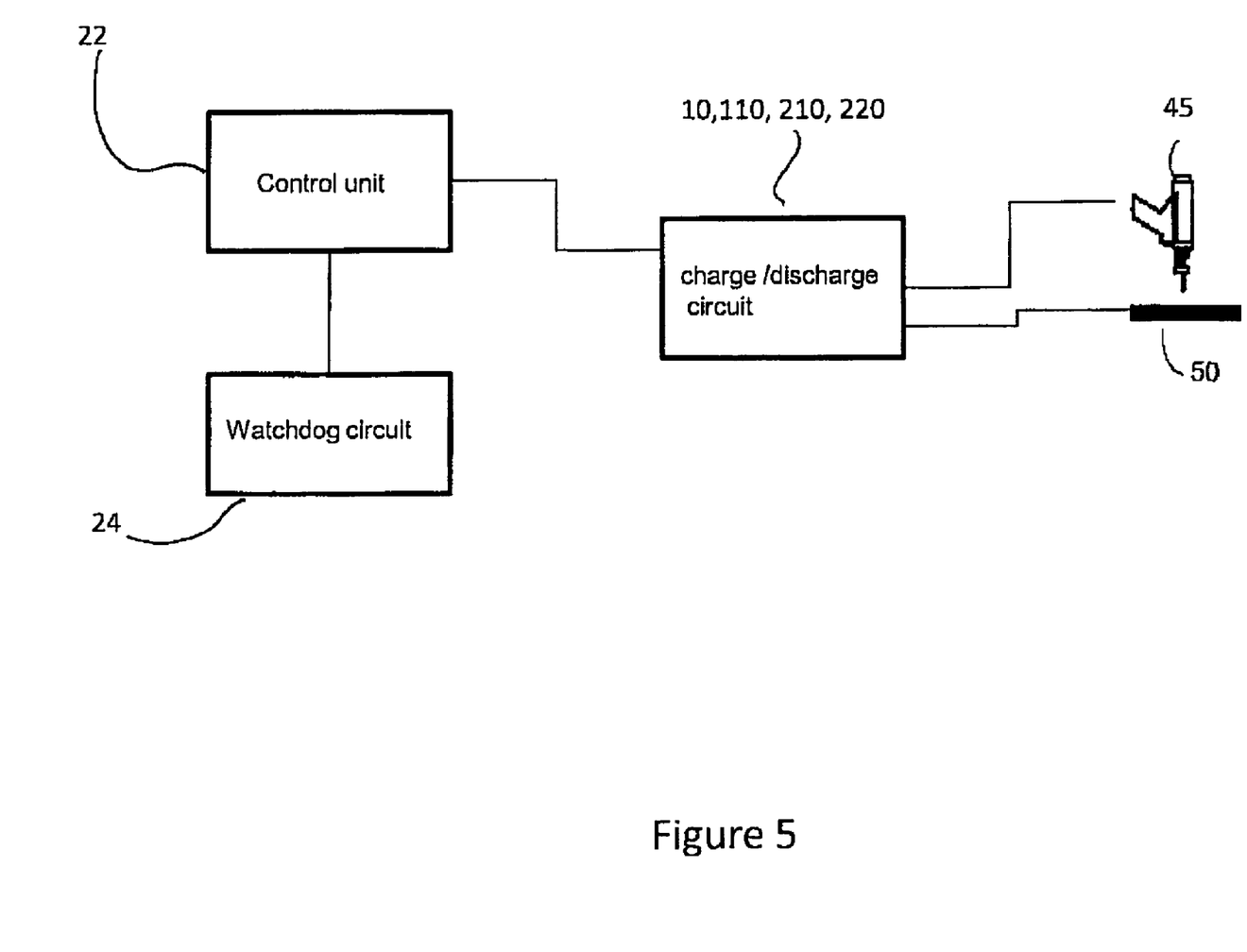
FIG. 5 a schematic diagram of a capacitor discharge welding circuit including a control system and watchdog circuit.

In one aspect, voltage sensors 65 may be supplied in the capacitor discharge welding circuit 10 at the at least two capacitor charge switches 25 to detect a voltage. Additionally, a voltage sensor 70 may be included that detects a voltage at the at least one capacitor 30 and a further voltage sensor 75 may be positioned at the welding output terminals 40 to detect a voltage supplied to the terminals. The various voltage sensors 65, 70, 75 may be linked with a control system or unit 22, as best seen in FIG. 5 for monitoring the voltage and to actuate or open and close the at least two capacitor charge and discharge switches 25, 35.

Figure 2:
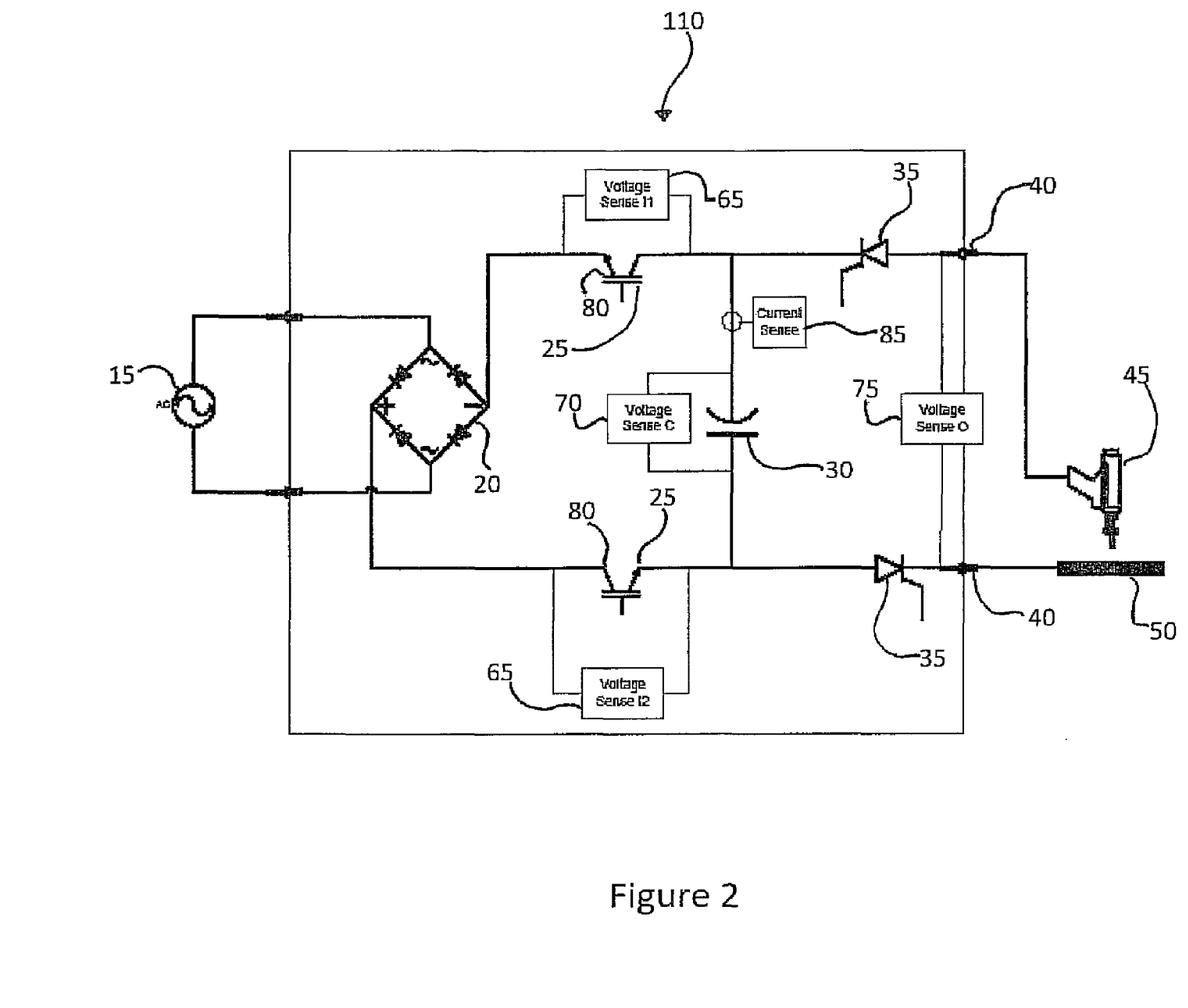
FIG. 2 is a schematic diagram of another embodiment of a capacitor discharge welding circuit.

Referring to FIG. 2, there is shown another embodiment of a capacitor discharge welding circuit 110. In the depicted embodiment, the relays 55 of the at least two capacitor charge switches 25 are replaced with solid state switches 80. In one aspect, the solid state switches 80 may include insulated gate bipolar transistors (IGBTs). Additionally, a current sensor 85 may be positioned in series with the solid state switch 80 positioned on the weld tool 45 line of the circuit. The current sensor 80 may be utilized to monitor the capacitor 30 charge current such that pulse width modulation pulses may be utilized to regulate the charge current at a desired level that is commensurate with the capacitor 30 rating and external fuse rating of the weld circuit. Additionally, the charge current may be adjusted to achieve a short charge time to maximize a duty cycle of a welder including the capacitor discharge welding circuit 110.

Figure 3A:
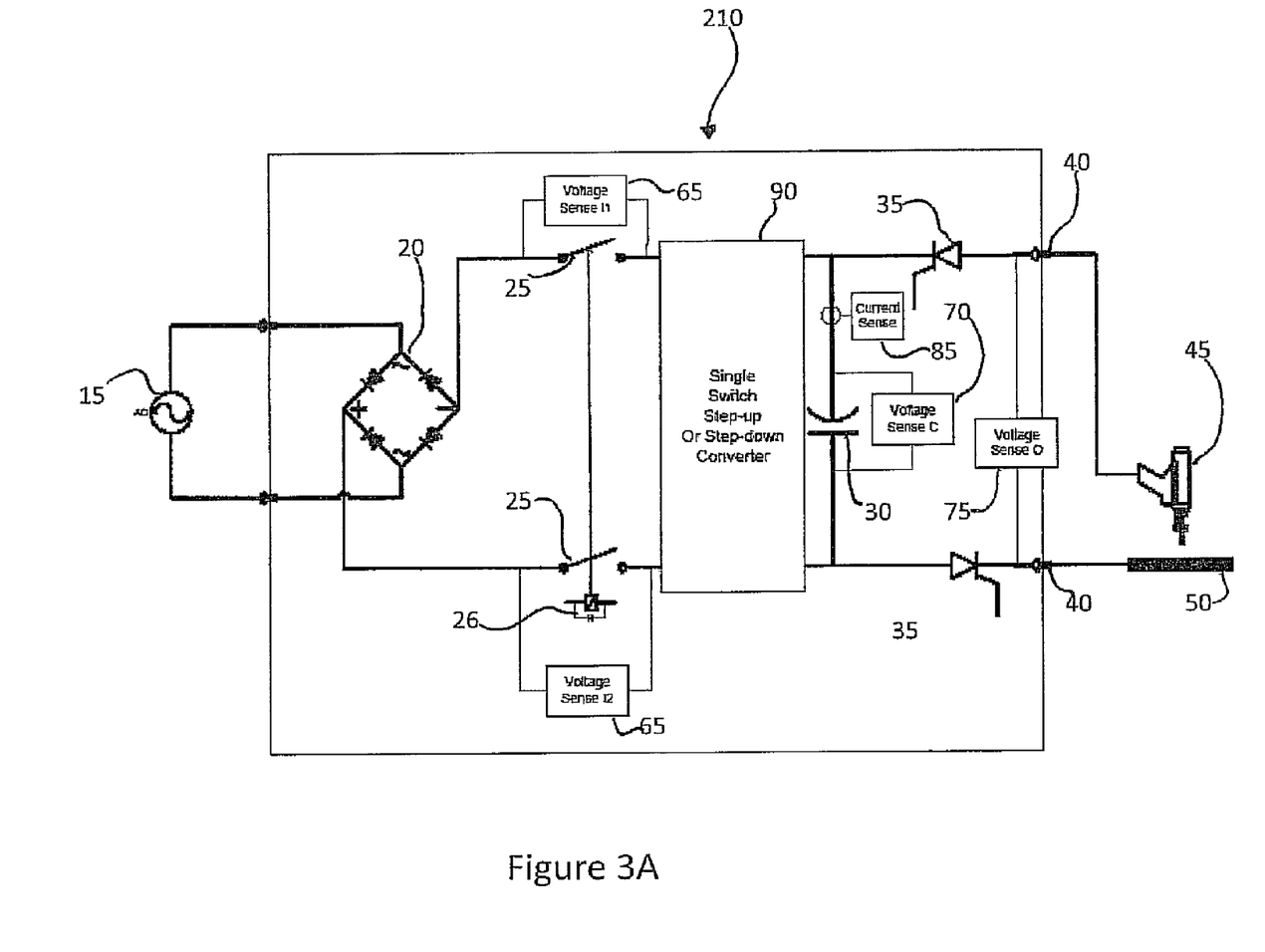
FIGS. 3A, 3B, 3C and 3D are schematic diagrams of other embodiments of a capacitor discharge welding circuit.
Figure 3B:
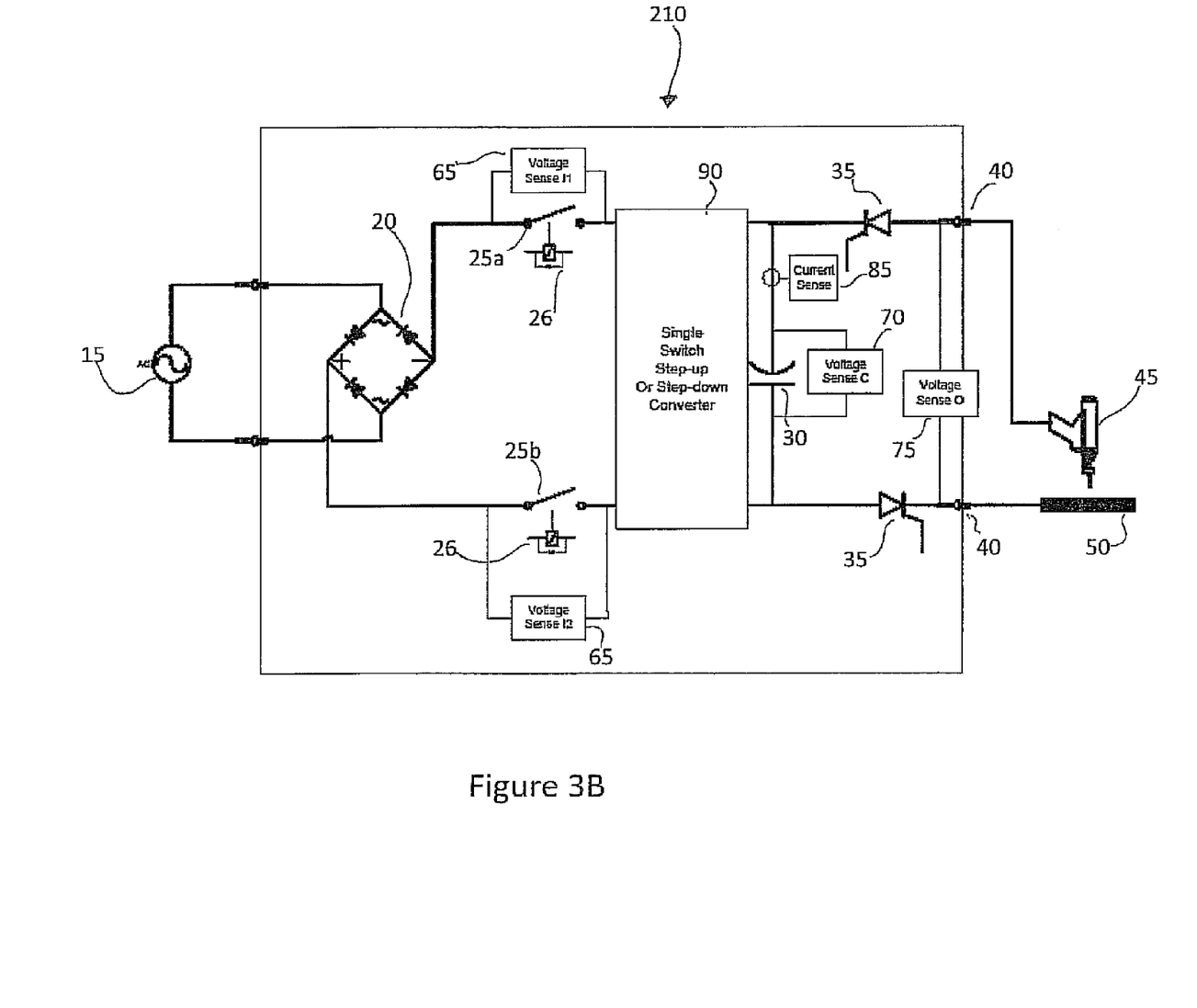
Figure 3C:
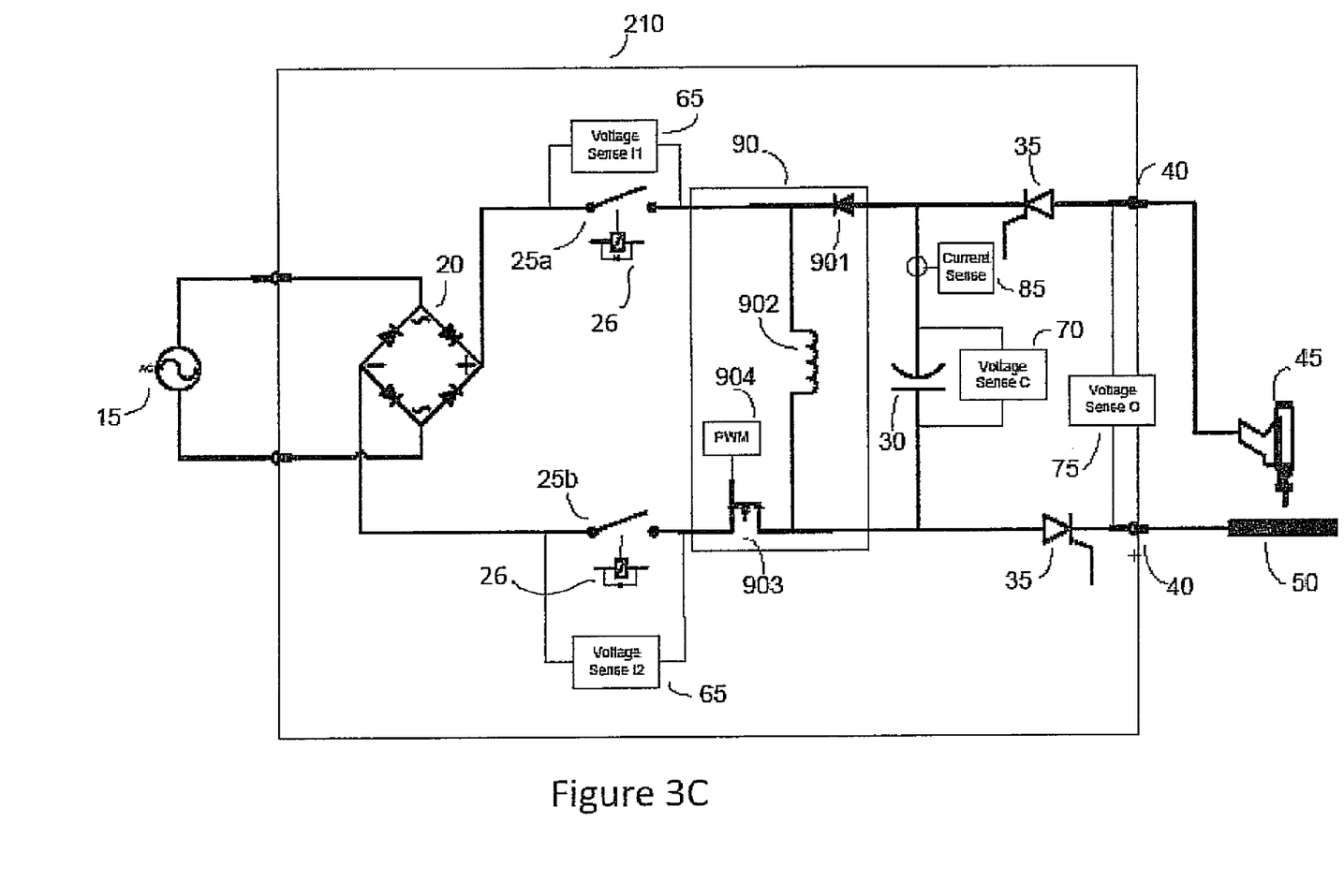

Referring to FIGS. 3A-D, there is shown other embodiments of a capacitor discharge welding circuit 210. In the depicted embodiments, a step-up or step-down converter 90 may included in line with the at least two capacitor charge switches 25 linked to a DC side of the rectifier bridge 20. The step-up or step-down converter 90 may be utilized to regulate a voltage supplied to the output terminals 40. Various step-up or step-down converters 90 may be utilized such as a buck boost converter, a single ended primary inductance converter or a Cuk converter. The step-up or step-down converter 90 provides the ability to adjust a welding voltage for specific applications. FIGS. 3C and D show a buck-boost converter implementation in 90. The gate of FET 903 rated at 30A, 1000V is controlled by a BiCMOS current mode PWM controller 904. When FET 903 is turned on, inductor 902 accumulates energy from input supply 15, and capacitor 30 is not charged due to blocking diode 901 rated at 30A, 1000V. When FET 903 is turned off, inductor 902 charges capacitor 30 through diode 901 in conducting state. FET 903 is switching by PWM 904 at 100 KHz-200 KHz frequency. The buck-boost converter flips the DC polarity from the output of bridge 20 to capacitor 30. The voltage of capacitor 30 is controlled by the duty cycle of PWM 904. One advantage of buck-boost converter 90 is that the capacitor 30 voltage can be higher than the voltage available at the DC side of bridge 20. In the prior art, boosting input voltage is accomplished by a heavy and costly transformer, but here it is accomplished by a low cost, low weight buck-boost converter. The voltage boost is advantageous in non-ferrous metal welding and welding on galvanized work pieces. Another advantage of the buck-boost converter 90 is that it accepts wide input voltage range from 115 VAC-230 VAC without any re-connect of taps of transformers to accommodate different input voltages. It also can regulate a stable capacitor charge voltage when input voltage is fluctuating.

Figure 3D:
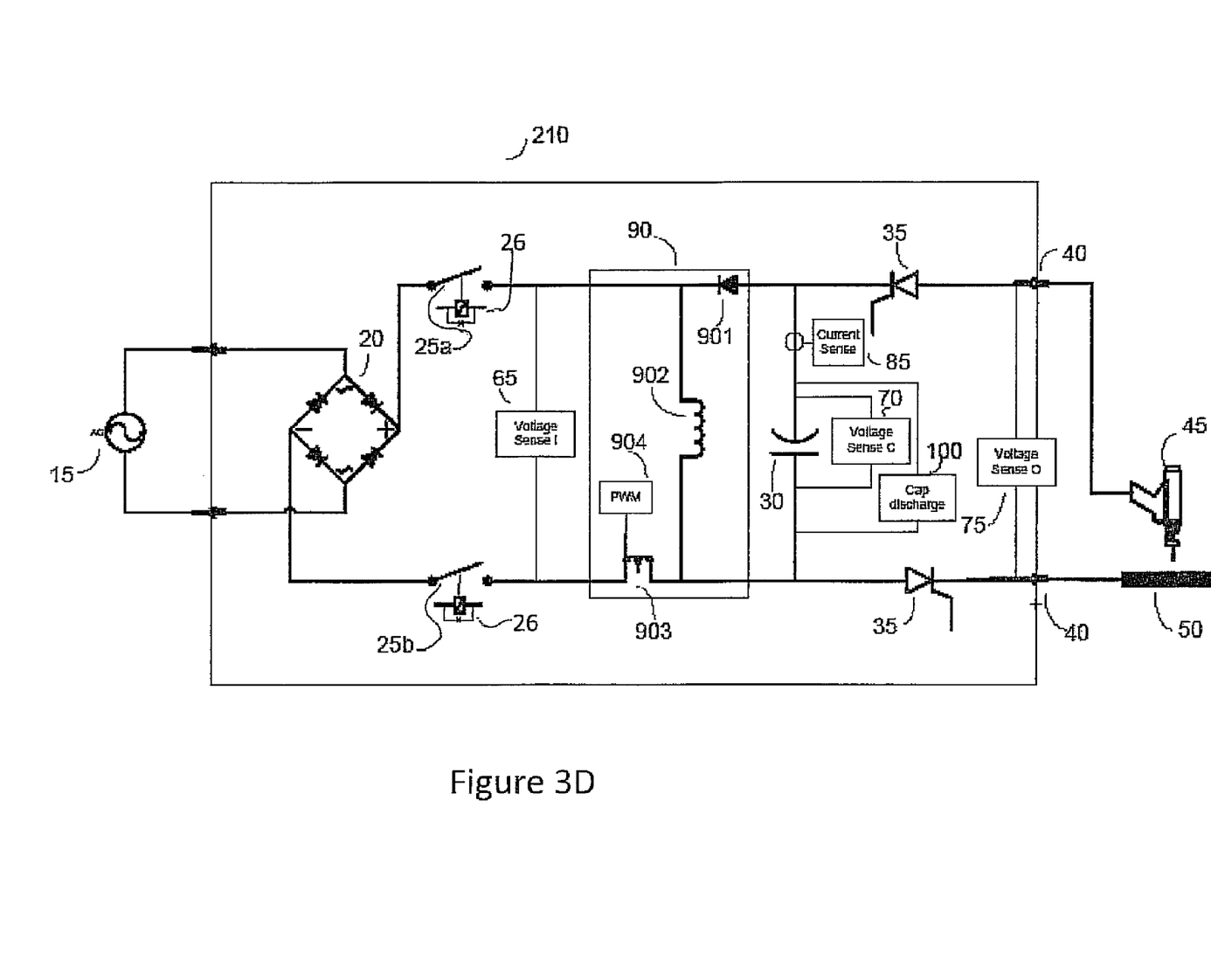

In FIG. 3A a single coil 26 may control the charge switches 25. In FIG. 3B independent coils 26 control the charge switches 25a and 25b. In FIGS. 3C and 3D there are depicted a buck boost converter as described above.

In FIG. 3D the voltage sensors 65 in FIGS. 3A-C is replaced with a single voltage sensor 65 across the DC bus. For self diagnostics, when the switches 25 are closed, it is expected that a fully rectified line voltage is measured by 65 and when the switches 25 are open the voltage should be absent. If these conditions are not met, the control system 22 will send an error message and disable welding. Additionally in FIG. 3D there is shown a capacitor discharge circuit 100. The capacitor discharge circuit 100 may include a resistor with a switch that dumps the voltage from the system to reset the voltage or shut down the system. To check the condition of each relay 55 or switch 25, various sequences may be used to control and monitor using the control system 22. For example in the embodiment of FIG. 3D: with both 25a and 25b open, sensor 65 should measure zero voltage; close 25a and leave 25b open and sensor 65 should measure zero voltage; open 25a, and close 25b, and sensor 65 should measure zero; close both 25a and 25b, sensor 65 should measure rectified DC voltage of line voltage. Any anomaly found in the values may result in a discharge of the voltage using the capacitor discharge circuit 100 and then disabling the welder such as disabling a trigger of the welder. Additionally, the output terminal 40 voltage may be measured with voltage sensor 75. The voltage may be actively measured using an applied sensing voltage to differentiate true zero output voltage rather than measurement of a broken lead.

Figure 4:
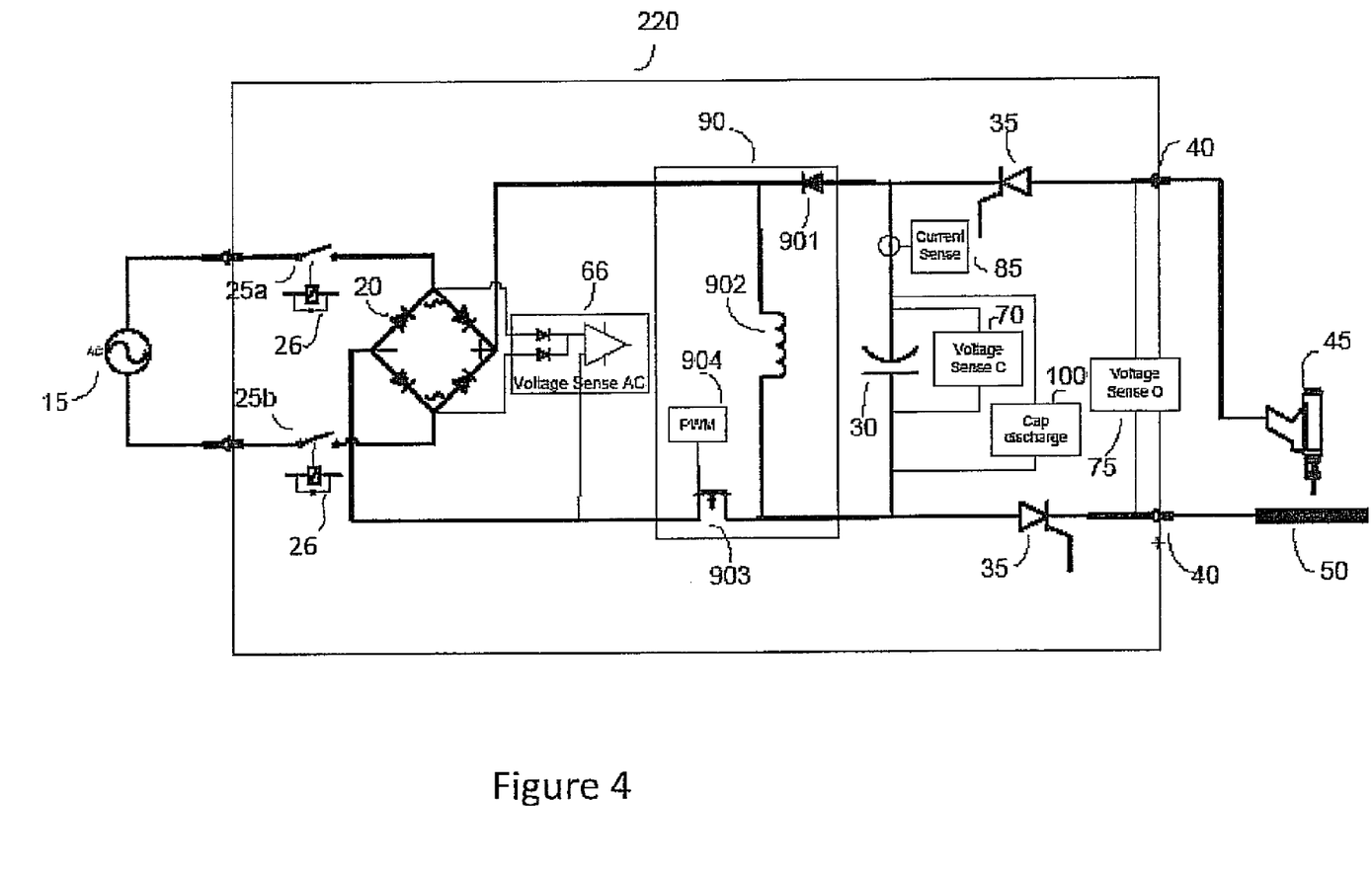
FIG. 4 a schematic diagram of another embodiment of a capacitor discharge welding circuit.

Referring to FIG. 4 there is shown another embodiment of a capacitor discharge welding circuit 220. In the depicted embodiment the charge switches 25 have been moved in front of the bridge 20. The sensor 66 senses the input voltage on the AC side instead of DC bus side. The voltage sensor 66 is monitoring the charge switches 25. The voltage sensor 66 may include two diodes to measure the AC voltage into an op-amp reference off the minus side of the DC bus. When switches 25 are open, sensor 66 should not see voltage. When switches 25 are closed, the sensor 66 should measure the AC line voltage via the diodes. When the switches 25 are not operating properly, such as when the relay contact 55 or switch 25 is permanently burned open or burned to a short, the control system 22 will send an error message and disable the welder.

Referring to FIG. 5, there is shown a schematic diagram of a capacitor discharge welding circuit according to any of the previously presented embodiments. The welding circuit 10, 110, 210 or 220 is connected to a control system 22 that monitors the various sensors and actuates the various switches and other components. In one aspect the various measurement or sensor circuits are isolated and powered by individual isolated power supplies. The measurement data may be fed to the control system 22 for sequencing and monitoring as well as providing various decisions such as to discharge the capacitor through the discharge circuit 100 and disable the welder if any of the self diagnostic measurements are not within specified settings. Also depicted are an independent watchdog circuit 24 that may monitor the control system 22 and the weld circuit. Should the control system 22 fail, the external independent circuit 24 may reset all the devices to its safe state (disable trigger, open capacitor charge switches 25 and discharge switches 35, and engage cap discharge circuit 100 to drain energy from capacitor 30).

There is also provided a process of utilizing a capacitor discharge welding circuit as disclosed in the previously described embodiments. The process may include the steps of a) providing an input voltage source 15, rectifier bridge 20 receiving the input voltage source 15, at least two capacitor charge switches 25 linked to the rectifier bridge 20, at least one capacitor 30 linked with the at least two capacitor charge switches 25, at least two capacitor discharge switches 35 linked with the capacitor 30 and to the welding output terminals 40. Additionally the process may include a step b) of charging the at least one capacitor 30 including closing the at least two capacitor charge switches 25 when the at least two capacitor discharge switches 35 are open. Further, step c) may include opening the at least two capacitor charge switches 25, disconnecting the capacitor 30 from the input voltage source 15 and providing isolation of the capacitor 30 from the input voltage source 15. Additionally step d) may include closing the at least two capacitor discharge switches 35 allowing current from the capacitor 30 to discharge through the output terminals 40 that are connected to the weld tool 45 and workpiece to be welded 50. Finally step e) may include opening the at least two capacitor discharge switches 35 cutting off a current path to the output terminals 40. In this manner, the alternating current input voltage source 15 may be isolated from the capacitor 30 and the output terminals 40 may also be isolated from the capacitor 30.

The process for capacitor discharge welding may also include the step of providing a voltage sensor 65 or 66 to detect a voltage at the at least two capacitor charge switches 25 as well as a voltage sensor 70 that detects a voltage at the at least one capacitor 30 and a voltage sensor 75 at the welding output terminals 40 that detects a voltage supplied to the terminals 40. Step b) may further include the step of monitoring the voltage sensor 65, 66 at the at least two capacitor charge switches 25 and a voltage at the at least one capacitor 30 for a value that is not equal to an expected value. For example in step b) the voltage detected at the at least two capacitor charge switches 25 is expected to be zero while the voltage at the capacitor 30 is expected to rise to a known value based on the input voltage and the voltage detected at the output terminals 40 is expected to be zero. If these voltage conditions deviate from the expected values, the step of aborting step b) wherein the at least two capacitor charge switches 25 and the at least two capacitor discharge switches 35 are opened and an error message may be sent may be performed.

The step of monitoring the voltage sensors 65, 66, 70, 75 provided in the various designs may be included in all of the steps b) through e) of the process. In step c), the voltage sensor 65 may be monitored at the at least two capacitor charge switches 25 for a value that is not equal to an expected value. For example, a voltage waveform is expected to be detected at the voltage sensors 65 under normal operating conditions. If the prescribed waveform is not seen the operation may be aborted, as previously described above. Further, in step d) the same voltage waveform should appear on the voltage sensor 65 at the capacitor charge switches 25. Further in step d) a discharge voltage profile should be seen in the voltage sensors 70 linked to the capacitor 30 and the output terminals 40. Further the onset of a short circuit after the fastener is plunged into the workpiece should also be observed. Any deviation from the expected results would result in aborting step d) as described above. Further, in step e) a near zero voltage should be observed at the voltage sensors 70, 75 associated with the capacitor 30 and output terminals 40 and the prescribed waveform should appear at the voltage sensors 65 associated with the charge switches 25. Again, any deviation from the desired or expected voltage readings will result in preventing step a) when gun trigger is pulled and that the at least two capacitor charge switches 25 and at least two capacitor discharge switches 35 are opened and an error message is sent.

The invention provides multiple advantages over the prior art, in eliminating the weight, cost and heat of a transformer while maintaining higher safety parameters. Additionally, the invention provides higher welding performance from better controllability of the capacitor charging voltage with wide voltage inputs. The welding apparatus may operate in either a contact or gap mode when performing a welding operation.

The invention has been described in an illustrative manner. It is to be understood that the terminology, which has been used, is intended to be in the nature of words of description rather than limitation. Many modifications and variations of the invention are possible in light of the above teachings. Therefore, within the scope of the appended claims, the invention may be practiced other than as specifically described.

The invention claimed is:

1. A capacitor discharge (CD) fastener welding circuit comprising:
  an input voltage source;
  a rectifier bridge of diodes receiving the input voltage source;
  at least two capacitor charge switches linked with the rectifier bridge;
  at least one capacitor linked with the at least two capacitor charge switches;

at least two capacitor discharge switches linked with the capacitor and to welding output terminals; and a voltage sensor detecting a voltage at the at least two capacitor charge switches, a voltage sensor detecting a voltage at the at least one capacitor and a voltage sensor at the welding output terminals detecting a voltage supplied to the terminals.

2. The capacitor discharge fastener welding circuit of claim 1 including a current sensor at the at least one capacitor sensing a current provided to the capacitor.

3. The capacitor discharge fastener welding circuit of claim 1 including a control system linked with the capacitor discharge fastener welding circuit for monitoring voltage and current sensors and actuating the at least two capacitor charge and discharge switches.

4. The capacitor discharge fastener welding circuit of claim 1, wherein the at least two capacitor charge switches comprise relay contacts.

5. The capacitor discharge fastener welding circuit of claim 1, wherein the at least two capacitor charge switches comprise solid state switches.

6. The capacitor discharge fastener welding circuit of claim 5, wherein the solid state switches comprise IGBTs.

7. The capacitor discharge fastener welding circuit of claim 1 including a switch-mode DC-DC converter between the at least one capacitor and the rectifier bridge.

8. The capacitor discharge fastener welding circuit of claim 7, wherein the DC-DC converter is selected from: a buck boost converter, a SEPIC converter and a Cuk converter.

9. The capacitor discharge fastener welding circuit of claim 1, wherein the at least one capacitor comprises a plurality of capacitors.

10. The capacitor discharge fastener welding circuit of claim 1 including a resistor connected to one charge switch on a DC side of the rectifier bridge.

11. The capacitor discharge fastener welding circuit of claim 1 including a current controlling device for controlling a capacitor charge current, the current controlling device selected from: resistors, switches or buck boost convertors.

12. The capacitor discharge fastener welding circuit of claim 1, wherein the at least two capacitor charge switches are positioned before the rectifier bridge of diodes.

13. The capacitor discharge fastener welding circuit of claim 1, wherein the at least two capacitor charge switches are positioned after the rectifier bridge of diodes.

14. A process for capacitor discharge fastener welding including the steps of:
a) providing an input voltage source, a rectifier bridge receiving the input voltage source, at least two capacitor charge switches linked with the rectifier bridge, at least one capacitor linked with the at least two capacitor charge switches, at least two capacitor discharge switches linked with the capacitor and to welding output terminals;
b) charging the at least one capacitor including closing the at least two capacitor charge switches when the at least two capacitor discharge switches are open;
c) opening the at least two capacitor charge switches disconnecting the capacitor from the input voltage source;
d) closing the at least two capacitor discharge switches allowing current from the capacitor to discharge through the output terminals;
e) opening the at least two capacitor discharge switches cutting off a current path to the output terminals.

15. The process for capacitor discharge fastener welding of claim 14 including the step of providing a voltage sensor detecting a voltage at the at least two capacitor charge switches, a voltage sensor detecting a voltage at the at least one capacitor and a voltage sensor at the welding output terminals detecting a voltage supplied to the terminals.

16. The process for capacitor discharge fastener welding of claim 15 including the step of monitoring the voltage sensor at the at least two capacitor charge switches and the voltage sensor at the at least one capacitor and the voltage sensor at the welding output terminals in any of steps b)-e) alone or in combination for a value that is not equal to an expected value.

17. The process for capacitor discharge fastener welding of claim 16 including the step of aborting steps b)-e) wherein at least one action selected from: opening the at least two capacitor charge switches and at least two capacitor discharge switches, dumping the charge in the capacitor through a capacitor discharge circuit, disabling a welder and sending an error message is performed.

18. The process for capacitor discharge fastener welding of claim 14 including the step of providing a current sensor at the at least one capacitor sensing a current provided to the capacitor.

19. The process for capacitor discharge fastener welding of claim 18 including the step of monitoring the current sensor at the at least one capacitor in any of steps b)-e) for a value that is not equal to an expected value.

20. The process for capacitor discharge fastener welding of claim 19 including the step of controlling the at least two capacitor charge switches using pulse width modulation.

21. The process for capacitor discharge fastener welding of claim 14 including the step of providing a DC-DC converter between the at least one capacitor and the rectifier bridge adjusting a capacitor voltage to a desired value.

22. The process for capacitor discharge fastener welding of claim 14, wherein the welding process utilizes contact CD mode.

23. The process for capacitor discharge fastener welding of claim 14, wherein the process utilizes gap CD mode.

24. A capacitor discharge (CD) fastener welding circuit comprising:
an input voltage source;
a rectifier bridge of diodes receiving the input voltage source;
at least two capacitor charge switches linked with the rectifier bridge;
at least one capacitor linked with the at least two capacitor charge switches;
at least two capacitor discharge switches linked with the capacitor and to welding output terminals; and
a current sensor at the at least one capacitor sensing a current provided to the capacitor.

* * * * *